US009016029B2

(12) United States Patent
Wagner

(10) Patent No.: US 9,016,029 B2
(45) Date of Patent: Apr. 28, 2015

(54) METHOD OF SETTING UP, MAINTAINING AND DISASSEMBLING A WIND TURBINE

(75) Inventor: Philipp Wagner, Mellrichstadt (DE)

(73) Assignee: X-Tower Constructions GmbH, Munich (DE)

( * ) Notice: Subject to any disclaimer, the term of this patent is extended or adjusted under 35 U.S.C. 154(b) by 0 days.

(21) Appl. No.: 14/119,594

(22) PCT Filed: May 25, 2012

(86) PCT No.: PCT/EP2012/002275
§ 371 (c)(1),
(2), (4) Date: Nov. 27, 2013

(87) PCT Pub. No.: WO2012/159775
PCT Pub. Date: Nov. 29, 2012

(65) Prior Publication Data
US 2014/0102039 A1    Apr. 17, 2014

(30) Foreign Application Priority Data

May 25, 2011    (DE) .......................... 10 2011 102 316

(51) Int. Cl.
| | |
|---|---|
| *E04B 1/00* | (2006.01) |
| *E04H 12/34* | (2006.01) |
| *F03D 1/00* | (2006.01) |
| *F03D 11/04* | (2006.01) |

(52) U.S. Cl.
CPC .............. *E04H 12/344* (2013.01); *F03D 1/001* (2013.01); *F05B 2240/912* (2013.01); *F05B 2240/913* (2013.01); *F05B 2240/916* (2013.01); *F03D 11/04* (2013.01); *Y02E 10/728* (2013.01); *F03D 11/045* (2013.01)

(58) Field of Classification Search
CPC ......... F03D 1/001; F03D 1/005; F03D 11/04; E04H 12/344; F05B 2240/916; B66C 23/207
USPC ................................ 52/745.18, 745.2, 745.17
See application file for complete search history.

(56) References Cited

U.S. PATENT DOCUMENTS

| | | | |
|---|---|---|---|
| 2010/0101086 A1* | 4/2010 | Amram ........................ | 29/889.1 |
| 2010/0281819 A1 | 11/2010 | Thompson | |
| 2011/0067353 A1 | 3/2011 | Tadayon | |
| 2012/0131880 A1* | 5/2012 | Delago et al. .............. | 52/745.18 |

OTHER PUBLICATIONS

Translation of International Preliminary Report on Patentability mailed Dec. 11, 2013.
International Search Report (German language)—mailed Dec. 6, 2012.

\* cited by examiner

*Primary Examiner* — Mark Wendell
(74) *Attorney, Agent, or Firm* — Carlson, Gaskey & Olds, PC

(57) ABSTRACT

A method of erecting, and a method of servicing or dismantling, a wind energy plant with a hub height of at least 140 meters makes provision that a heavy-duty lifting device is temporarily disposed on a tower top for any installing, exchanging, or disassembling purposes, and subsequently is dismantled immediately, with all these operations being carried out without using an external crane. A light-duty lifting device attached to the tower serves for erecting the tower, so that no external large-scale cranes are required. For disassembling or exchanging the large components, an auxiliary lifting device is able to transport the heavy-duty lifting device to the top of the tower and is also capable of lowering the heavy-duty lifting device from there.

24 Claims, 9 Drawing Sheets

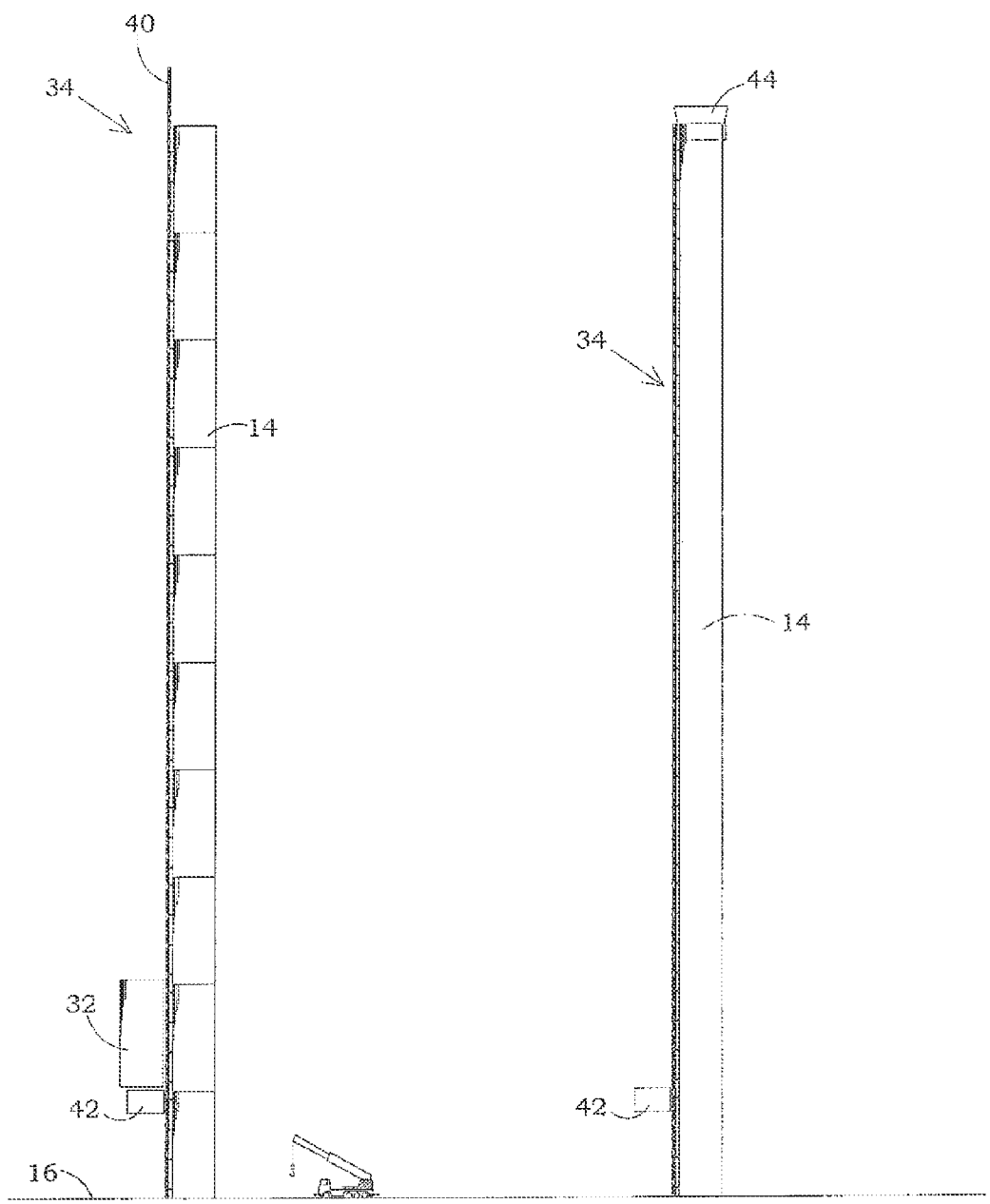

Fig. 4a
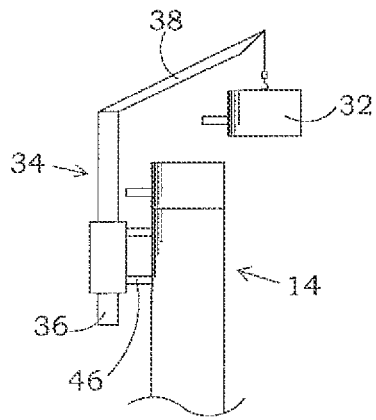
Fig. 4b
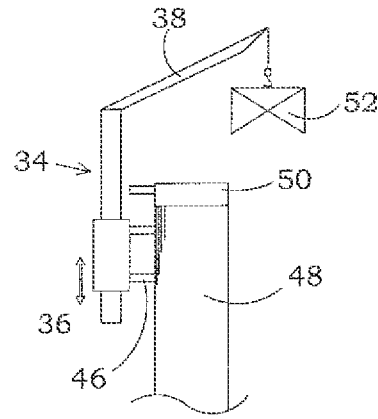
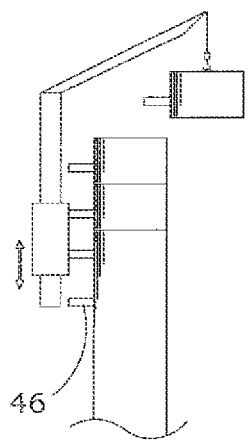
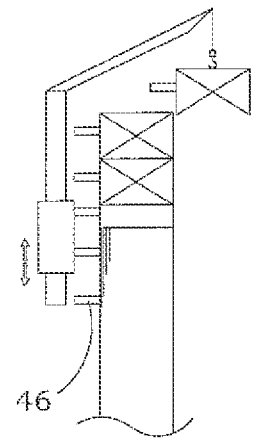
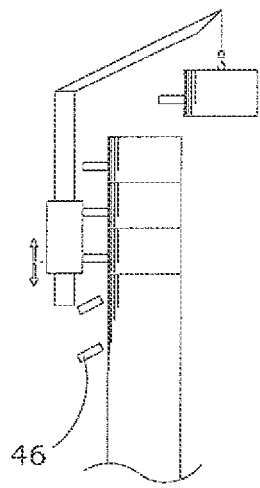
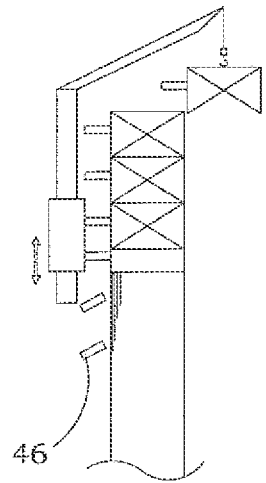

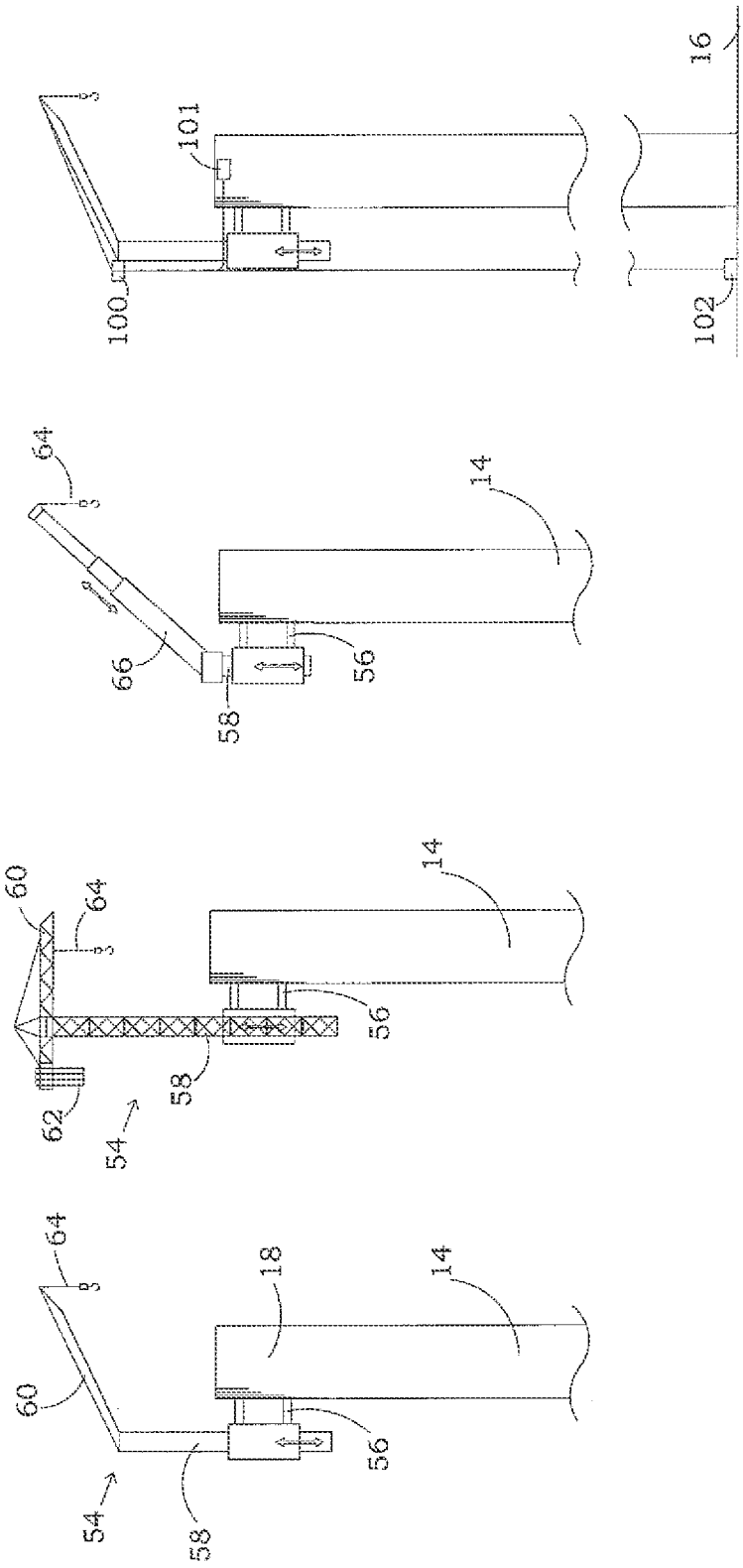

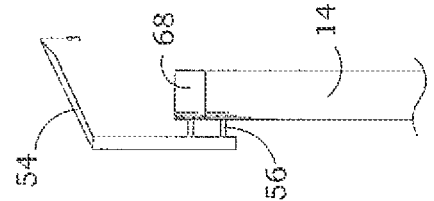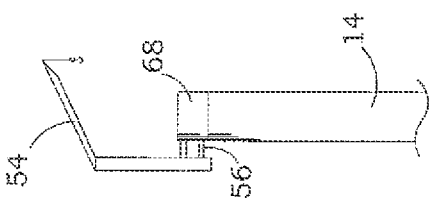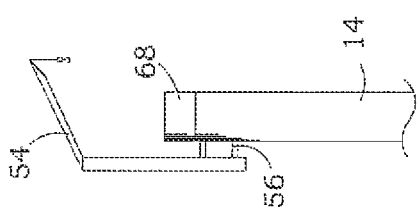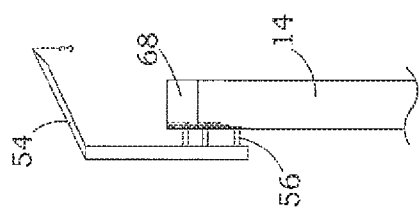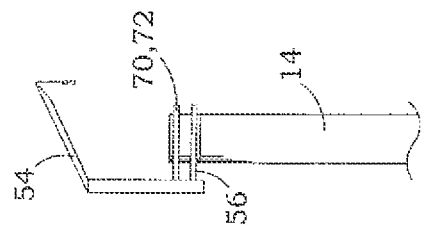

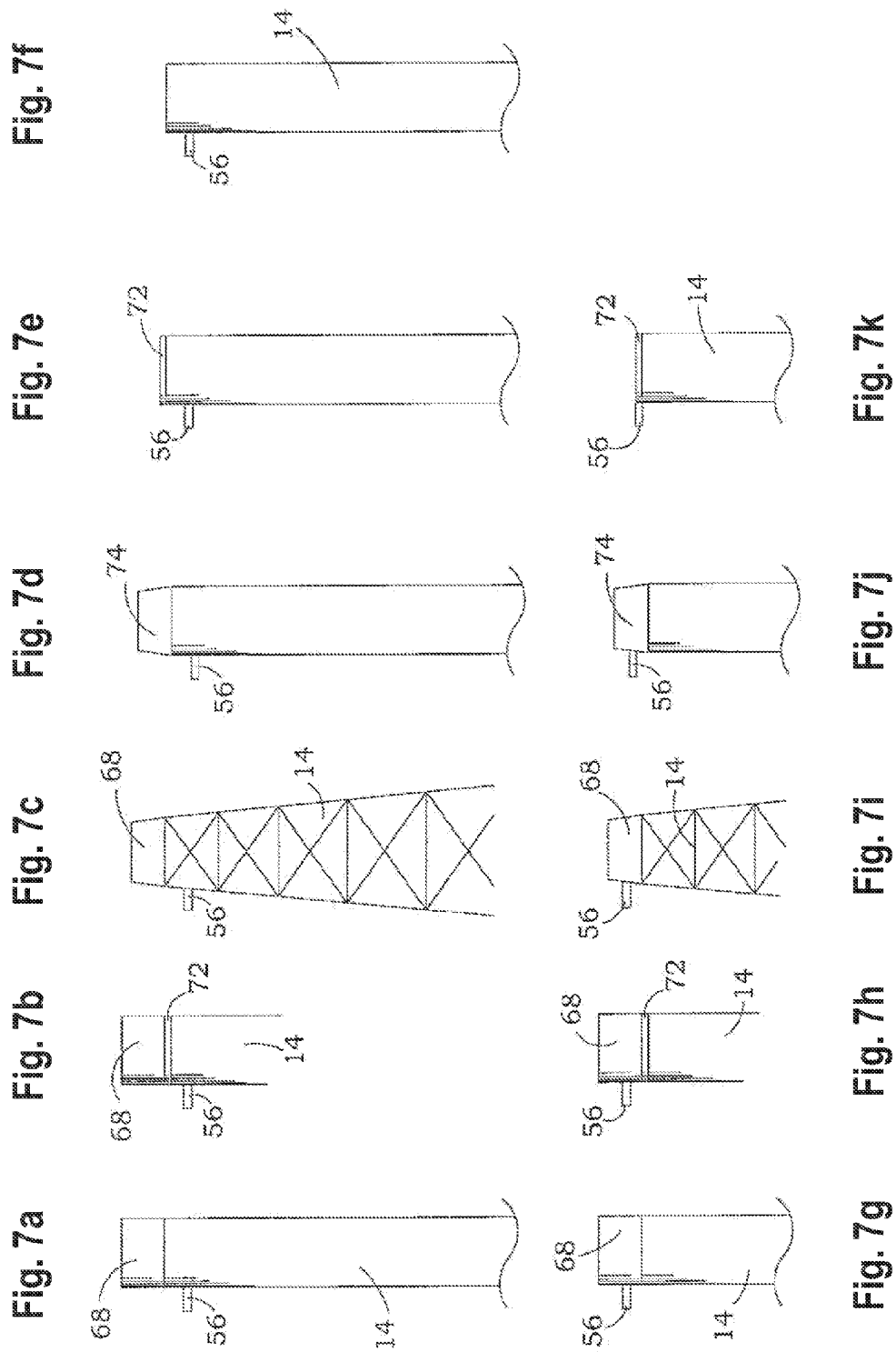

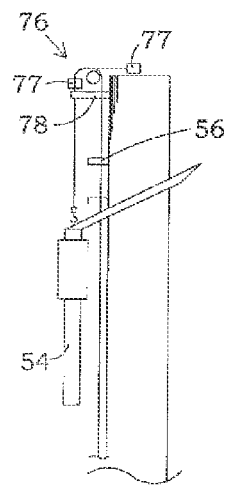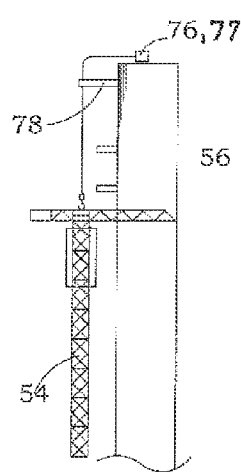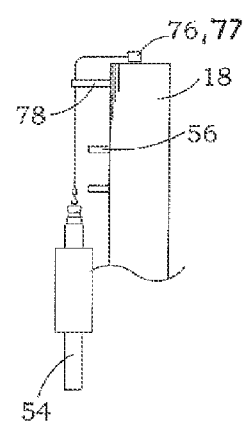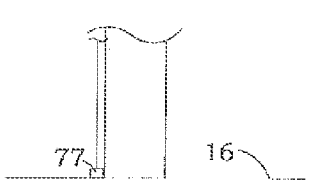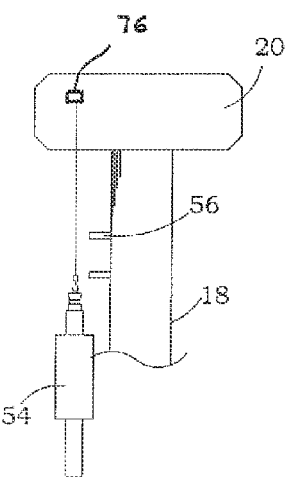
Fig. 9a  Fig. 9b  Fig. 9c
Fig. 9d

METHOD OF SETTING UP, MAINTAINING AND DISASSEMBLING A WIND TURBINE

RELATED APPLICATION

This application is the U.S. national phase of PCT/EP2012/002275 filed May 25, 2012, which claims priority to DE 10 2011 102 316.3, filed May 25, 2011.

TECHNICAL FIELD

The invention relates to a method of erecting, servicing, and dismantling wind energy plants, in particular with a hub height of at least 140 meters.

BACKGROUND

Wind energy plants with a horizontal rotor axis, to which the methods of the invention are related, comprise a tower and very heavy, large components attached to the tower top. These large components are the nacelle, the electric generator, the rotor comprising at least one rotor blade and, if any, a gearbox for the rotor.

Wind energy plants of different size, power, and of various types are spreading in ever increasing numbers, in order to produce electric energy from the kinetic energy of the wind. The effectiveness of such a wind energy plant depends, among other factors, on the fact that the wind is present as long and as evenly distributed as possible throughout the year.

It is known that the yields which can be produced by wind energy plants from the wind supply distributed over the year are the larger the higher the wind energy plants can be constructed, as in at larger heights the wind blows faster on an average and in a more laminar fashion. This applies in particular to inland regions, or to hilly or mountainous regions.

In the recent years, the trend is moving towards ever increasing wind energy plants due to economic considerations, with the most widespread type of wind energy plants, the type with a multi-blade rotor having a horizontal axis and being provided on a tower, still having the largest market potential. Above all, the problem of this type of wind energy plant is that its large components increase in size together with the height of the hub; for this reason, installing, disassembling, and above all, the maintenance of such large-scale wind energy plants with hub heights starting from 140 meters are crucial factors for economic efficiency.

In recent years, different tower types have been tested to increase the hub height and take the rotor to the higher atmospheric layers with improved wind availability. Here, in particular hybrid towers comprising a shaft made of concrete and a fitted steel mast where the nacelle is placed, as well as girder masts are to be mentioned.

Usually, the construction of such wind energy plants is carried out in wind parks using mobile large-scale cranes. The highest cranes currently available are crawler cranes by which the large components are lifted to hub heights of 140 meters and more. The crawler cranes or also truck-mounted cranes are used to erect the tower itself, for instance by stacking concrete, steel rings, or concrete or steel segments as prefabricated components on top of each other and connecting them. As an alternative to this, using a climbing formwork is also possible, of course. In the latter scenario, the mobile large-scale crane transports the formwork parts and the concrete to the respective height. Sliding formworks are vertically supplied with concrete and construction steel by using rail-type lifts which exclusively serve for transporting the building materials required for concreting to the momentary tower end of the concrete shaft. Having erected the concrete shaft, the sliding formwork is dismantled and transported to the ground via the rail-type lift.

The daily rents for such large-scale cranes are immense, independently of the fact that only few of these special devices are available in the individual countries and are fully booked due to tight plans of action. The mere construction of a large-scale crawler crane may already take several days. Cranes with a hoisting capacity of 150 tons and a reach of up to 140 meters have assembly periods of roughly three days.

Daily rents of 10.000.00 Euro and more are common. What is more, these large-scale cranes can be operated at low wind speeds at best, so that naturally delays at the building site occur as soon as the weather is less than optimal, as the distance between the standing position and the installation point amounts to more than 140 meters.

For maintenance purposes, in particular in the event of defects on the large components, the large-scale cranes must be rented in the short term, which is not possible at all in many cases because of the low quantities available on the market. Further, the paths leading to the wind energy plants and the area around the wind energy plants must always be kept in good condition or kept cleared for these large-scale cranes in order to facilitate a short-term repair operation with large-scale cranes at all. This circumstance also reduces the income return of the wind energy plants due to the downtimes of the plants until the large-scale cranes are ordered, erected and are operated at suitable weather conditions.

In order to avoid the use of expensive large-scale cranes, growing tower slewing cranes have been used in the past during the construction of towers of wind energy plants. These cranes are capable of setting up themselves starting from a height of approximately 30 meters and are relatively powerful, having a maximum load on the cantilever arm of more than 1000 meter-tons. They can reach heights in almost unlimited fashion, so to speak, but also have enormous daily rents, as they provide a very high performance throughout the entire period of the building procedure. With such growing, large-scale tower slewing cranes, the tower is erected and the large components are placed on the tower top after having erected the tower. Here too, the distance between the last support point and the installation point is 50 meters or more. In the event of maintenance, the entire tower slewing crane has to be ordered, set up, and used again.

Further, a girder mast tower of a wind energy plant comprising a temporarily fitted crane head has already been built. With this crane head and an obliquely running support cable, it was possible to hoist the nacelle to the tower top. The traction cable was deflected on the crane head and guided to a winch fastened to the ground. The crane head was dismounted when the nacelle had been attached. Subsequently, the lighter rotor blades were transported to the hub by using separately standing, mobile large-scale cranes.

In order to carry out any repair of large components in a short time, proposals have already been made to permanently install a crane on the tower top, with which the large components can be exchanged. This proposal has not been able to assert itself, as the cost for such a highly motorized and powerful crane are too high in relation to the number of its applications.

Both the mobile crawler girder mast cranes and the tower slewing cranes are transported to their place of action on dedicated, special low-bed trucks and erected there completely, or in part, with auxiliary cranes. The logistics for setting up a crawler girder crane or tower slewing crane having the required performance is enormous and produces further costs for the transport to and from the site, as well as for erecting and dismantling.

In the case of hub heights of more than 170 meters, free-standing crawler girder cranes are not available at present.

SUMMARY

A method of erecting a wind energy plant as well as a method of servicing and disassembling a wind energy plant are provided, which avoid the disadvantages mentioned above and, in particular, reduce the costs for construction, installation and disassembly.

The method of erecting a wind energy plant, in particular with a hub height of at least 140 meters, comprising a tower and large components attached to the tower top, the large components comprising a nacelle, a generator and a rotor comprising at least one rotor blade and, if any, a gearbox for the rotor, include the following steps:

a light-duty lifting device designed for lightweight loads is used for erecting the tower and is attached to the tower during construction, in order to gain height together with the tower during construction of the tower, a heavy-duty lifting device suitable for the installation of the large components is transported to the tower and is temporarily coupled with the latter for forming a heavy-duty crane, using the tower as a crane mast, at least one large component, such as the generator for example, is lifted by the heavy-duty lifting device to the tower top and installed there, and the heavy-duty lifting device is decoupled from the tower after installation of the large components.

The construction method and the method of servicing and dismantling (which will be explained below) work with large lifting devices tailored for erecting and servicing or dismantling individual parts and components, without the need of external large-scale cranes or helicopters. As lifting tools with differing weights and costs are used in different periods, the expensive, heavy lifting tool can be used for a period which is as short as possible, significantly improving the economic efficiency. Moreover, the tower structure serves as a crane mast, making additional, separate crane masts or girder crane cantilevers up until these heights superfluous.

For erecting the tower, a light-duty lifting device is used, which would not be capable of transporting a generator to the tower top. The light-duty lifting device, however, is able to carry out the erecting of the tower, as the device wanders upward together with the tower and is supported by the already erected part of the tower. Hence, the erected part of the tower forms the crane mast for the light-duty lifting device. Also, for the heavy-duty lifting device which is only used for a short period, the tower constitutes the crane mast, which means that the heavy-duty lifting device is supported by the tower, too. Neither the light-duty lifting device nor the heavy-duty lifting device is an external, separately standing crane such as a crawler crane, truck-mounted crane, or tower slewing crane. Due to the support on the tower and using the tower as a crane mast, the light-duty lifting device can be of light-weight construction, and it is possible to use a cost-effective variant of lifting devices.

If need be, an external crane, for example a small truck-mounted crane can be used for the first few meters (at most 30 meters, preferably at most only 10 meters) of the tower shaft, the crane putting the first prefabricated components, the first formwork, or the light-duty lifting device in place. Afterwards, no external crane is required according to one example embodiment of the invention.

Another embodiment even makes provision that no external crane is used at all, not even for the above-mentioned exceptions.

Thus, the heavy-duty lifting device is only used for the few highest loads which are mounted on the top by the end of the method of manufacturing the plant, and hence are used temporarily for a short time. In the method according to the invention, no helicopter will be used also.

The term "light-duty lifting device" as compared to the term "heavy-duty lifting device" means that the light-duty lifting device has a significantly lower maximum lifting capacity than the heavy-duty lifting device and that the light-duty lifting device is not capable of carrying the entire generator of the wind energy plant to the top, the generator in the case of large-scale wind energy plants having a weight of usually more than 40 tons nowadays, or preferably, is not even able to transport any of the above-mentioned large components to the top.

Hence, the terms "light-duty" and "heavy-duty" are terms which characterize a comparison of the maximum loads of the lifting devices which are used.

The heavy-duty lifting device is transported to the tower top in particular while being supported by the tower, is temporarily fastened thereto, and is removed from the tower while being supported by the tower. This means that the heavy-duty lifting device is conveyed to the tower top and installed in the area of the tower top.

As an alternative to this, it would also be possible to permanently or only temporarily install a cantilever arm, or a relatively small crane frame, in the area of the tower top for the purpose of installing the large components, and to leave the expensive lifter, i.e. the drive unit for the heavy-duty crane, on the ground, to fetch it when necessary and couple it to a traction feature which can be wound and unwound, reaches as far as to the cantilever arm or crane frame, and is deflected there. This results in a heavy-duty crane comprising a drive unit on the ground.

According to one example embodiment, the light-duty lifting device has a maximum lifting capacity which is smaller than that of the heavy-duty lifting device by at least the factor 2, preferably at least by the factor 10.

The invention makes provision in one embodiment that the heavy-duty lifting device has a lifting force of at least 40 tons.

Preferably, the heavy-duty lifting device should have been taken off from the tower before the initial operation of the wind energy plant, i.e. before the permanent operation of the plant. For any test runs prior to the actual startup, the heavy-duty lifting device may still remain on the tower top, for example to replace any large components which have been found to be defective in the startup operation.

According to one embodiment of the invention, the light-duty lifting device is able to lift the heavy-duty lifting device to the tower top. It is preferred that the light-duty lifting device transports the heavy-duty lifting device from the tower top to the ground after installation of the large components; however, this is not compulsory. The heavy-duty lifting device may be capable of moving from the tower top to the ground by itself, where appropriate.

The light-duty lifting device may be a rail-type lift or a climbing crane. Similar to elevators, rail-type lifts are fastened to the outer side of the tower and comprise rail elements which can be assembled e.g. in modular fashion and are stacked one on top of the other. By using these rail-type lifts, persons as well as loads are transported to the tower top, for instance also materials like in-situ concrete or prefabricated parts of the tower shaft.

It is preferred that the light-duty lifting device is removed immediately after construction of the wind energy plant and prior to its continuous operation.

The light-duty lifting device or the heavy-duty lifting device is also able to transport a so-called auxiliary lifting device to the tower top, which remains permanently fastened to the wind energy plant, i.e. also during the regular operation of the wind energy plant.

At least one of the following materials or of the following objects for erecting the tower is moved upward on the tower by the light-duty lifting device in order to heighten the tower: concrete, reinforcement material, concrete formwork, prefabricated tower segments or prefabricated tower rings, wood, composite parts, a steel mast and/or steel mast elements.

The method of servicing or disassembling a wind energy plant, in particular with a hub height of at least 140 meters, comprising a tower and large components attached to the tower top, said large components comprising a nacelle, a generator and a rotor comprising at least one rotor blade and, if any, a gearbox for the rotor, includes the following steps:

for exchanging or dismantling a large component, a heavy-duty lifting device suitable for the installation of large components is transported to the tower and is temporarily coupled with the latter for forming a heavy-duty crane, using the tower as a crane mast, the large component(s) is/are exchanged or dismantled by means of the heavy-duty lifting device, and the heavy-duty lifting device is decoupled from the tower after having exchanged or dismantled the large component(s).

The method of servicing or dismantling the wind energy plant does also not provide an external crane which removes the large component(s) from the tower top. Rather, the tower structure is used in the same way as a crane mast, by employing the heavy-duty lifting device only for the short working period of exchanging or dismantling the large components, but in other respects is decoupled from the tower, so that it is not necessary to provide every tower with its own, expensive heavy-duty drive unit or to supply external cranes according to prior art. Not until there is a pending maintenance or disassembly, the heavy-duty lifting device is fetched and coupled to the tower with which it may do its work like during construction.

Accordingly, the heavy-duty lifting device is removed from the wind energy plant after the exchange of a large component prior to restarting and possibly after a test run.

In particular, the heavy-duty lifting device is pulled to the tower top while being supported by the tower top, is temporarily fastened to the latter and, after having exchanged or dismantled the large component(s), is removed from the wind energy plant while being supported by the tower top, without the need of using an external crane or a helicopter.

As with the method of erecting the wind energy plant, the following applies as well: It is also possible to permanently or only temporarily install a cantilever arm or a relatively small crane frame on the tower top for the purpose of installing/exchanging/dismantling the large components and to leave the costly lifter, i.e. the drive unit for the heavy-duty crane, on the ground, to fetch it when required and to couple it to a traction feature which can be wound and unwound, reaches as far as to the cantilever arm or crane frame and is deflected there. This results in a heavy-duty crane comprising a drive unit placed on the ground. Incidentally, same applies to the auxiliary lifting device set out below. Here again, the drive unit may be situated on the ground and a traction feature deflection unit may be provided in the area of the tower top.

Generally speaking, the following applies to the method according to the invention: If it is only the drive unit of the heavy-duty lifting device for installing or dismantling the large components which is temporarily disposed on the tower and is set up and dismantled again, the drive unit (also referred to as a lifter) constitutes the mobile heavy-duty lifting device. If the drive unit and the crane frame/cantilever arm are temporarily set up for installing/disassembling the large components and are dismantled again, the drive unit and the crane frame or the drive unit and the cantilever arm form the mobile heavy-duty lifting device.

Preferably, an auxiliary lifting device is attached to the tower top and is capable of lifting the heavy-duty lifting device from the ground to the tower top or is able to lift a traction feature for coupling to the heavy-duty lifting device from the ground to the tower top.

Preferably, the auxiliary lifting device should be permanently fastened in the area of the tower top, for instance on the tower top or the nacelle.

Embodiments for the auxiliary lifting device are simple electric winches, i.e. cost-effective, robust and reliable lifting devices. The cost for such lifting devices will amortize already during the first use, as compared to the previous expenses for servicing large components.

The auxiliary lifting device may be provided on a tower cantilever arm or on the nacelle itself. The nacelle projects laterally with respect to the tower top and offers a good opportunity to lower a traction feature from it to ground. As an alternative to this, a simple cantilever arm may laterally project from the tower top by some extent, which is permanently fastened to the tower top. It is via the cantilever arm that the traction feature of the auxiliary lifting device is lowered to the ground, in order to transport the heavy-duty lifting device to the tower top or to carry the traction feature of the heavy-duty lifting device to the tower top, so that the heavy-duty lifting device is able to pull itself up to the top by its own force.

The following options are applicable both for the method of erecting and for the method of assembling and dismantling.

Preferably, also the heavy-duty lifting device is a winch or a strand jack or uses a winch or a strand jack as a lifter, but with a significantly higher lifting force than that of a light-duty lifting device. Winches or strand jacks are relatively cost-effective mass-produced components whose purchase price is a fraction of the purchase price of a truck-mounted crane; further, they are low-maintenance. Moreover, winches and strand jacks are very robust and easy to maneuver, and can be stowed and transported without any problems. A wind park plant operator may purchase a single, relatively cheap lifting device of this type and store it in its wind park and, if need be, transport it to the defective wind energy plant in a very easy fashion and in very short time. Same applies to the manufacturers, in particular with respect to the warranty obligations in the connection with the full-maintenance contracts, which are usual by now, and the service network to be maintained.

The heavy-duty lifting device may comprise a crane which includes a crane frame and is temporarily disposed on the tower top for servicing or dismantling purposes and after the maintenance or disassembly of the large components is removed from the tower top again. With this embodiment, the heavy-duty lifting device thus comprises the crane frame and the drive unit, i.e. the lifter (such as a strand jack or winch).

It is also possible, however, that a crane frame comprising a boom is permanently present on the tower top; the heavy-duty lifting device would then be temporarily coupled to said boom for forming a crane.

The crane frame can be movable in vertical direction, can be pivotable and/or can be moved around the tower to lower the large components from the tower top or to transport them to the tower top.

For quick installation of the heavy-duty lifting device, mounting brackets for the heavy-duty lifting device should be attached permanently on the tower top.

These mounting brackets may be attached to one or more of the following components:

a head adapter as a transition between the tower and the nacelle, a transition piece between a lower and an upper tower section, an intermediate flange for fastening a steel mast or a nacelle, a part of the machine frame of the wind energy plant or another adapter piece between the tower top and the wind turbine, and/or a steel mast fitted on a lower tower section.

These mounting brackets are, for instance, retainers laterally projecting from the tower or from the adapter or from the machine frame or from parts of the machine frame or from other transition pieces, or are flanges, dowels or holes which are accessible from the side.

Alternatively or in addition thereto, a crane bridge may be permanently attached to the tower top, the heavy-duty lifting device being fitted to the crane bridge and able of being moved thereon. In this case, the heavy-duty lifting device consists of a lifter comprising a corresponding drive unit and a sort of crane carrier or crane arm or fly-jib.

One option makes provision that a tower cantilever arm is permanently provided on the tower top and is engaged by the heavy-duty lifting device. This cantilever arm may also be implemented as a rigid construction.

Unlike the variant in which the light-duty or heavy-duty or auxiliary lifting device is pulled to the tower top by any other lifting device, one or more of these lifting devices are able to pull themselves up to the tower top by themselves.

In particular if the lifting device comprises a crane frame and additionally comprises the lifter, i.e. the drive unit, it may be advantageous to pull up the components all together, to fasten them to the tower top and to swivel them to the initial position. As an alternative to this, it is also possible to fasten the lifting device and to put it through the mounting bracket in order to reach the working position.

The heavy-duty lifting device should have a lifting force by its own which is so large that it is capable of lifting each of the large components to the top.

The preferred embodiment of the invention makes provision that the heavy-duty lifting device has a lifting force of up to 300 tons.

The auxiliary lifting device should have a maximum lifting force of 25 tons, preferably at most 20 tons and/or the light-duty lifting device should have a lifting force of up to 2 tons at most.

Further, the auxiliary lifting device should have a lifting force which is sufficient to pull up the heavy-duty lifting device to the tower top on the whole.

In particular, the invention provides that the heavy-duty lifting device is fastened in the area of the tower top during installing and/or disassembling the large components, so that there are no long lever arms as is the case with a tower slewing crane or mobile crane placed on the ground, with which the positioning of the components, suspended thereon, is very difficult for installing and disassembling purposes, all the more with windy weather.

The heavy-duty lifting device preferably comprises, which is not to be understood as limiting, in particular an electrically driven lifter, e.g. a winch or a strand jack, as well as a cantilever arm or a crane frame, so that it protrudes over and above the nacelle when installed on the tower top and is capable to readily lower the nacelle down to the ground.

In order to obtain a guidance of the long, driven traction feature from the tower top to the ground, a taut guider and/or a guider which is fastened along the tower is/are provided, e.g. in the form of a retaining or guiding cable. This applies independently of the fact whether the drive unit for the lifting device is provided on the tower top or situated on the ground.

These and other features may be best understood from the following drawings and specification.

BRIEF DESCRIPTION OF THE DRAWINGS

Further features and advantages of the invention will be apparent from the following description and the following drawings to which reference is made and in which:

FIG. 3a shows an embodiment of the method according to the invention, in which prefabricated parts are assembled to a tower by using a rail-type lift, FIG. 3b shows a variant of the method according to the invention, in which the tower is erected with in-situ concrete via a rail-type lift, FIGS. 4a and 4b show various variants of a climbing light-duty lifting device for erecting the wind energy plant according to the method of the invention, each Figure showing three working steps, FIGS. 5a to 5d show various variants of the heavy-duty lifting device used in the methods according to the invention, FIGS. 6a to 6e show various variants of the method of the invention, in which the heavy-duty lifting device is fastened to the tower by different methods and structures, FIGS. 7a to 7l show various mounting brackets used in the methods according to the invention and situated on the tower top for the temporary attachment of the heavy-duty lifting device, FIGS. 9a to 9d show various variants of the method according to the invention with different heavy-duty lifting devices during hoisting or lowering.

DETAILED DESCRIPTION

Figure 1:
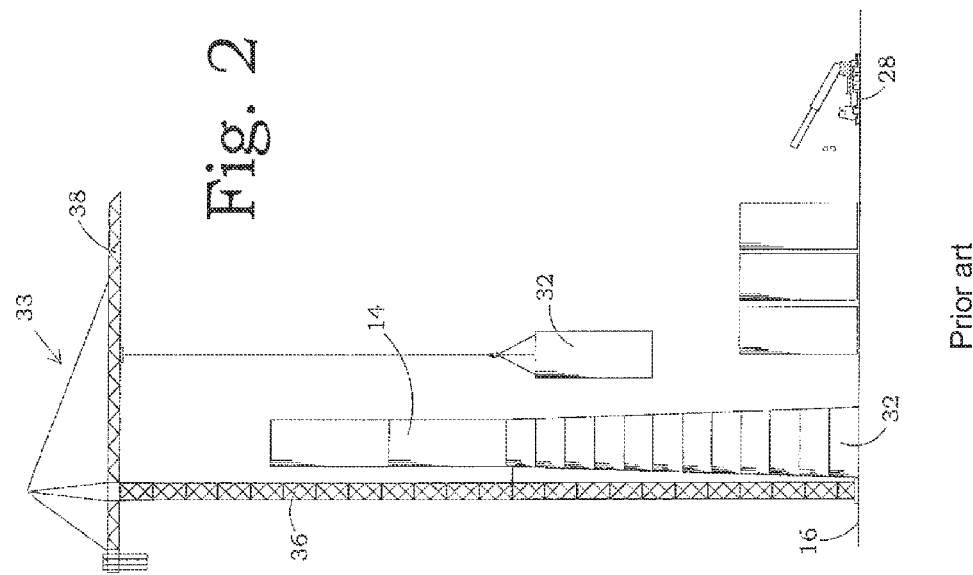
FIG. 1 shows a schematic view of a wind energy plant which can be erected according to the method of the invention and can be serviced and uninstalled according to the method of the invention, a mobile heavy-duty crane used according to the prior art being also shown in FIG. 1.

FIG. 1 illustrates a wind energy plant 10 comprising a foundation 12, a tower including a shaft 14 provided on the foundation 12, a nacelle 20 placed onto the top 18 of the tower and comprising a rotor with several rotor blades 22, a gearbox 24 coupled to the hub of the rotor, as well as a downstream generator 26 for power generation. The term "tower top" is not limited to the top surface of the free end of the shaft 14, but stands for the upper end portion of the tower, here of the shaft 14.

The wind energy plant has a horizontally arranged rotor hub with an axis A, which is at least 140 m above ground. Accordingly, this is a large-scale wind energy plant.

The fully equipped nacelle 20, the housing of the nacelle, the gearbox 24 (if any), which is usually accommodated in the nacelle housing, as well as the generator 26 likewise provided in the nacelle housing, and the rotor blades 22 each form what is called large components which are located on the top 18 and have a weight of several dozen tons in each case.

For erecting such a wind energy plant or for servicing it, including any repair works, and for disassembling it, it has been customary to use mobile large-scale cranes, such as crawler cranes or truck-mounted cranes 28 comprising telescope-type booms or girder booms 30. These mobile cranes have also been used for the construction of the shaft 14.

The shaft 14 itself may be manufactured by different ways and means, for instance in that a lower portion is made of concrete, which has a steel mast fitted thereon and forming the upper end of the shaft 14. Such towers of wind energy plants are referred to as hybrid towers. Furthermore, there also exist pure steel towers, pure concrete towers or girder mast towers, and in recent times even wooden towers.

Figure 2:
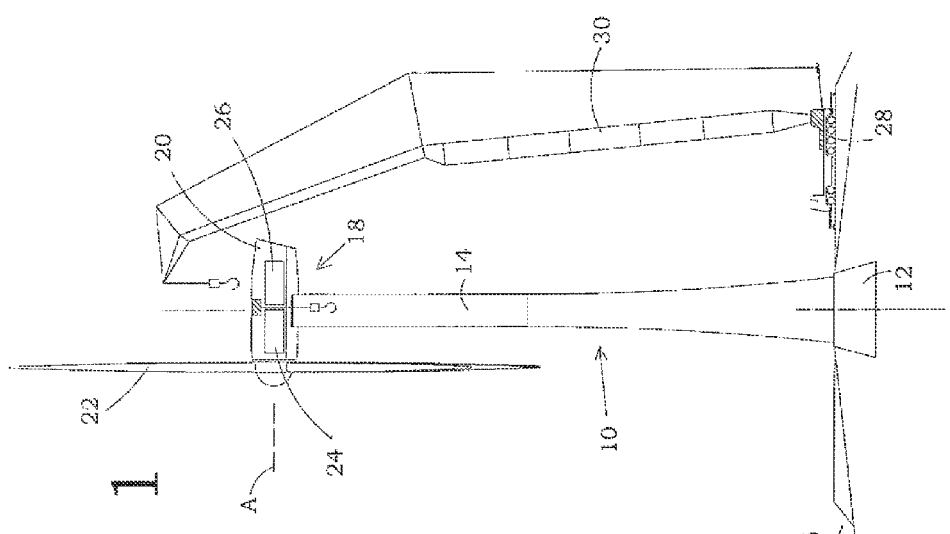
FIG. 2 shows a variant of a method according to prior art for erecting a wind energy plant by means of a growing crane.

The concrete towers or the concrete section of the shaft 14 are/is either produced in in-situ concrete, for instance with a moved formwork, or by using prefabricated components, as is shown in FIG. 2. These two methods can also be used with the method of the invention for erecting a wind energy plant.

In the case of prefabricated components, either complete prefabricated rings 32 or segments, which are complemented after having been placed on the already finished part of the shaft, can be stacked one upon the other. This also applies to shafts or shaft sections made of steel or wood, or to girder masts.

FIG. 2 illustrates a first construction phase of erecting a wind energy plant with a hub height of at least 140 meters. Here, an external tower slewing crane 33 is used which is designed for lighter but also very heavy loads, in the present case being a so-called growing crane. This crane comprises a shaft 36 starting from the ground 16 and being composed of elements, with the possibility that further elements can be inserted in between or placed thereon, so that the height of the shaft 36 increases together with the tower height. A pivotable boom 38 is attached to the upper end of the shaft.

The crane 33 is of the free-standing type, and it may be fastened at most to the upper end section at a few points, if required to the already existing part of the shaft 14. This crane, however, is a separately standing and external crane. It is by using this crane 33 that the prefabricated rings 32 are put on top of each other and then all the large components are conveyed to the tower top 18 and installed there.

FIG. 3a shows a light-duty lifting device 34 which in this embodiment is implemented as a rail-type lift. The rail-type lift does not stand stably by inherent stability and not so as to be external to and separate from the already erected part of the shaft 14, but is fastened to the existing part of the shaft 14 along the entire length at numerous points, so that the tower itself represents the support for this not self-standing lifting device which accordingly may be of simpler construction and have a somewhat smaller robustness, but is more cost-effective in rental and purchase for this reason. The rails 40 are composed of rail segments which can be coupled to each other, so that the rail 40 grows together with the construction of the shaft 14.

The light-duty lifting device 34 is capable of completely setting up the shaft 14; preferably, same applies to the other embodiments. Its maximum lifting capacity is a few tons, e.g. at most 25 tons, in particular at most 20 tons. The light-duty lifting device 34 is not capable of carrying a rotor blade 22 or even the generator of the wind energy plant to the top, as its maximum lifting capacity is too low.

With the embodiment illustrated in FIG. 3a, the shaft 14 is assembled of prefabricated rings 32 or segments, so that the construction itself does not require any external crane or helicopter. From the first ring 32 to the last ring 32, it is exclusively the light-duty lifting device 34 which is used. A mobile crane 28 or a small slewing crane may be used, if need be, for delivering, relocating or positioning the first prefabricated parts of the shaft.

By using the light-duty lifting device 34, a steel mast may be placed on the top of the concrete shaft, which is not mandatory, and subsequently be fixed thereto.

A lift car 42 travels along the rail 40 from the ground 16 to the end of the rails 40 in electrically driven manner, i.e. to the current upper end of the shaft 14, in order to transport rings 32, segments or any other parts required for erecting the shaft 14 to the upper end of the shaft 14.

Fully assembled rail-type lifts have a maximum lifting capacity of likewise only a few tons (at present approximately 5 tons) and are not able to transport a rotor blade, or even a whole generator having an own weight of several dozen, tons to the top of the fully erected tower. Such rail-type lifts, however, are very cheap in their rental and purchase and are very flexible, and can be installed and demounted within a short time, without requiring an additional lifting device.

It is to be emphasized with respect to FIG. 3a that, instead of the prefabricated parts of concrete, steel rings or ring segments, girder segments, or wooden segments can be assembled by using the light-duty lifting device 34 to a shaft 14 or shaft section.

The embodiment according to FIG. 3b does not use prefabricated concrete parts; rather, the concrete section of the shaft 14 is manufactured using in-situ concrete. Here again, a light-duty lifting device 34 in the form of a rail-type lift is used, which is fastened to the existing part of the shaft 14, which means that it is not external, i.e. not realized so as to be free-standing.

A so-called sliding formwork 44 is preferably supplied by the light-duty lifting device 34 during the process of concreting. The concrete is also carried by the light-duty lifting device 34 to the current upper end of the shaft 14. Here too, no external, separate lifting device is used.

Also in the embodiment according to FIG. 3, the light-duty lifting device 34 may be used for fitting a steel mast, for instance during erecting a hybrid tower. Here too, an external crane or helicopter for fitting the steel mast is not necessary.

FIG. 4a shows a light-duty lifting device 34 in the form of a self-climbing, i.e. climbing crane whose crane mast or shaft 36 may optionally be adjustable in vertical direction and which comprises a boom, in particular a pivoting boom 38. The crane is attached to the existing part of the shaft 14 with mounting brackets 46.

The light-duty lifting device 34 transports prefabricated rings 32, or more general, elements made of concrete, wood or steel, or corresponding segments from the ground 16 to the instantaneous end of the shaft 14, in order to stack them on top of each other and connect them to each other.

Here, the mounting brackets 46 (e.g. projecting parts, flanges, openings) are fastened in the area of the existing upper end of the shaft 14. The mounting brackets 46 may have already been fastened to the prefabricated parts when on ground or only after having placed them on the existing part of the shaft. The light-duty lifting device 34 permanently climbs upward via the mounting brackets 46, with the option that the lower mounting brackets 46, which are no longer used, are removed (see lowermost Figure of FIG. 4a).

As already explained, said climbing crane can be used with concrete towers or hybrid towers for setting prefabricated segments, a climbing formwork, steel segments or the steel mast.

FIG. 4b shows a tower which has a lower portion 48 made of steel or concrete, for instance, and which has a transition piece 50 placed thereon which forms the basis for stacking girder mast sections 52 thereon one upon the other by the lifting device 34. Here too, mounting brackets 46 are provided for the climbing crane, which can be detached from the shaft. As an alternative to this hybrid design, the shaft may also be realized as a pure girder mast shaft.

The drive unit, i.e. the lifter of the light-duty lifting device, may be positioned on its crane frame, on the tower, or on the ground.

When the tower has been built up completely, a heavy-duty lifting device 54 is attached to the top 18 of the tower. This heavy-duty lifting device 54 is provided for the installation of the large components and carries them from the ground 16 to the top 18. The heavy-duty lifting device 54 thus has a lifting capacity of several hundred tons, preferably up to 300 tons. The process of carrying the heavy-duty lifting device 54 to the top 18 is also performed without any external crane or helicopter, by again using the tower as a support during transportation. To this end, the light-duty lifting device 34 may be used, conveying the heavy-duty lifting device 54 to the top 18 in one piece or in individual parts.

As an alternative to this, it would also be possible that the heavy-duty lifting device 54 pulls itself up to the top by itself, similar to the case as will be explained below on the basis of the FIG. 10. In this case, the light-duty lifting device 34 would carry a traction feature 64, for instance a steel cable of the heavy-duty lifting device 54, to the top 18 and fasten or deflect it there. Subsequently, the heavy-duty lifting device 54 could pull itself up to the top 18 using the traction feature.

Generally, it has to be underlined that the heavy-duty lifting device 54 is only used for the installation of the heavy, large components and for a very short period, i.e. it is transported to the tower and temporarily coupled to the latter for the formation of a heavy-duty crane, using the tower as a crane mast.

In the embodiments according to FIGS. 5a to 5c, the heavy-duty lifting device 54 is fastened to mounting brackets 56 on the side of the top 18, which project towards outside with respect to the shaft 14. Alternatively, the heavy-duty lifting device 54 could also be positioned on the upper side of the top 18.

In the embodiment according to FIG. 5a, the heavy-duty lifting device 54 is a crane comprising a shaft 58, for instance capable of being vertically moved, and a boom 60. As an option, the crane or the boom alone may be pivotable.

In the embodiment according to FIG. 5b, the heavy-duty lifting device 54 is a girder mast crane comprising a shaft 58 which is also preferably vertically adjustable, and a boom 60 which has its opposite side provided with an arm comprising counter weights 62. Optionally, this crane may be pivotable, too. The position of the traction feature 64 on the boom 60 can be adjusted by using a crane trolley (not shown).

The heavy-duty lifting device 54 according to FIG. 5c is a crane comprising a telescopic boom 66. Also this crane may be of the pivoting type and/or be vertically adjustable in the area of the shaft 58.

The lifter, i.e. the drive unit for the heavy-duty crane 54 being set up, may be attached to the crane frame that has been transported to the top, see lifter 100, or can be disposed on the tower top 18 and, via a traction feature (usually a cable), may be coupled to a deflection feature provided on the crane frame, see lifter 101.

Alternatively, for installing the large components it would also be possible according to FIG. 5d to permanently, or only temporarily, fasten a cantilever arm or a relatively small crane frame to the tower top 18, and to leave the expensive lifter 102, i.e. the drive unit for the heavy-duty crane, on the ground, to fetch it when required and to couple a traction feature (cable) to it which can be wound and unwound, which traction feature reaches up to the cantilever arm or crane frame and is deflected there. This results in a heavy-duty crane comprising a drive unit on the ground.

FIGS. 6a to 6e show in detail that the heavy-duty lifting device 54 may be fastened to the top 18 at various places. As a mere example, a heavy-duty lifting device as illustrated in FIG. 5a is shown here, which is not to be understood as limiting. Rather, this crane is supposed to represent a symbol for any type of heavy-duty lifting device 54.

A so-called head adapter 68 is placed on the shaft section 14 of concrete or steel according to option (a) and is intended to serve as a transition piece between the shaft 14 and the nacelle 20 and preferably has a sort of steel frame. As an alternative, the head adapter 68 is designed as a flange only.

In the embodiment according to FIG. 6a, the heavy-duty lifting device 54 is fastened both to the head adapter 68 and to the shaft section underneath it.

In the embodiment according to FIG. 6b, the heavy-duty lifting device 54 is fastened only to the head adapter 68, and in the embodiment according to FIG. 6c it is only fastened to the shaft 14 underneath the head adapter 68.

As is shown in FIG. 6d, it is also possible to provide several fastening locations, in fact on the shaft 14 and/or on the head adapter 68.

While according to the embodiments of FIGS. 6a to 6d the heavy-duty lifting device 54 is attached to a stationary point on the tower, the embodiment according to FIG. 6e provides a guide 70 extending around the tower end, along which the heavy-duty lifting device 54 can move around the tower. As an alternative to this, a crane bridge or intermediate flange 72 may be present which, for instance, may be laterally fastened to the tower.

If a steel mast is provided instead of a head adapter 68 according to FIG. 6b, the heavy-duty lifting device 54 is attached to the upper end of the steel mast. Illustratively, the head adapter 68 represents the steel mast in this case.

FIGS. 7a to 7l illustrate various variants of the design of the tower and of the tower top and of the positioning of the mounting brackets 56 for the heavy-duty lifting device 54.

FIG. 7a shows the shaft 14 and the head adapter 68 as well as the mounting bracket(s) 56 provided on the shaft 14.

Between the head adapter 68 and the shaft 14, the above-mentioned intermediate flange may be provided, carrying reference numeral 72 in FIG. 7b. It may be possible that also this flange is provided with the mounting bracket 56 (see FIG. 7l).

In the case of the girder mast tower according to FIG. 7c, the mounting bracket 56 is provided in the area of the girder mast shaft, but it could also be present (see FIG. 7i) on an optionally provided head adapter 68.

The mounting bracket 56 provided on the head adapter 68 is also present in the structures according to FIGS. 7g and 7h, in which the head adapter 68 is placed immediately on the shaft 14 (see FIG. 7g), possibly with intercalation of the intermediate flange 72 (see FIG. 7h).

If a transition piece 74 placed on the shaft is provided, as is shown in FIGS. 7d and 7k, the mounting bracket 56 may be fastened to the transition piece 74 and/or to a point just below the transition piece 74. The nacelle or the head adapter 68 will then be placed on the transition piece 74.

In the embodiment according to FIG. 7f, the mounting bracket 56 is provided on the shaft 14 itself; here, the nacelle is placed directly on the shaft 14.

It goes without saying that the mounting brackets 56 are provided on several of the parts and sections which are illustrated here, which is advantageous. FIGS. 7a to 7l only show options regarding the fitting of the mounting brackets 56.

It is preferred that the mounting brackets 56 remain on the tower permanently, to allow the heavy-duty lifting device being attached again for servicing, including any repair works, or for dismantling the large components on the tower.

Figure 8C:
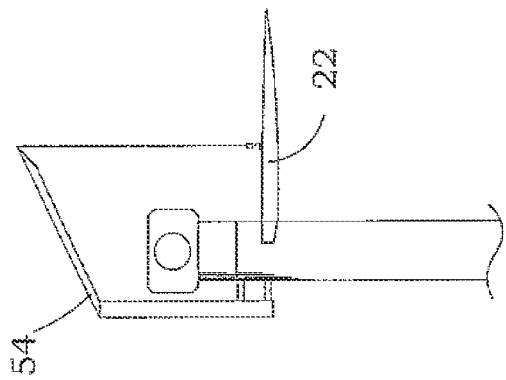
FIGS. 8a to 8c show various steps of the method according to the invention, in which large components are installed on the tower top.
Figure 8B:
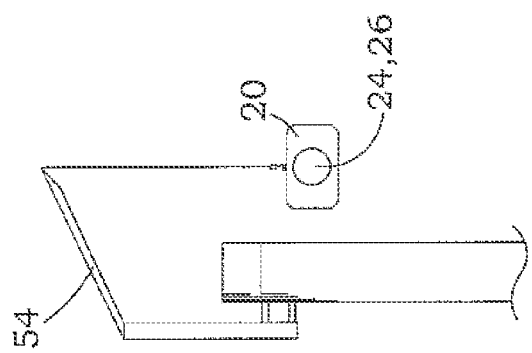
Figure 8A:
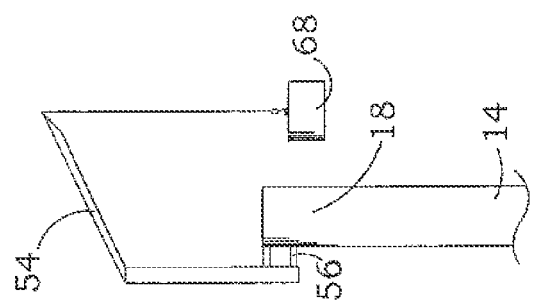
Figure 10A:
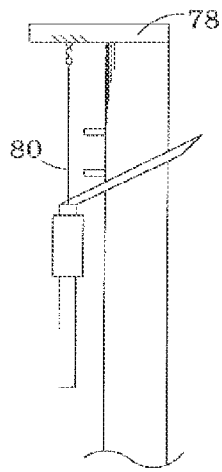
FIGS. 10a to 10d show the various heavy-duty lifting devices which pull themselves up into the working position by themselves.
Figure 10B:
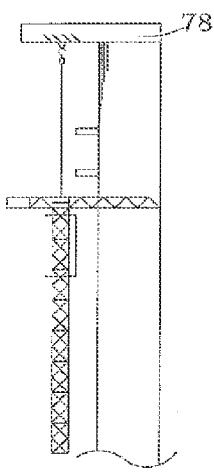
Figure 10C:
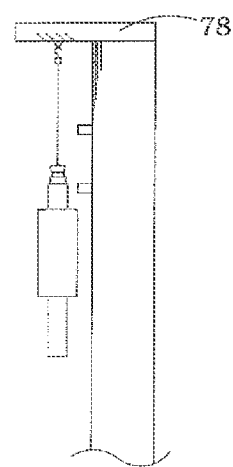
Figure 10D:
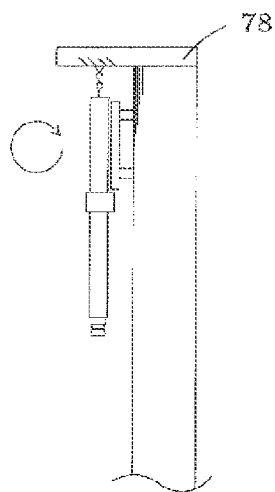

In the next step, as illustrated in FIGS. 8a to 8c, the large components are transported by the heavy-duty lifting device 54 from the ground 16 to the top 18. In doing so, it is possible that the intermediate flange 72 or the head adapter 68 are placed on the shaft 14 first (see FIG. 8a).

The nacelle 20, preferably already equipped with the gearbox 24 and the generator 26, is placed onto the top 18 (see FIG. 8b). This process too is carried out exclusively with the heavy-duty lifting device 54.

Subsequently, the very heavy rotor blades 22 are pulled upward from the ground to the nacelle 20 by the heavy-duty lifting device 54 and are installed on the nacelle. Also in this installation, an external crane transporting the large components to the top 18 is not required.

Merely during lifting the rotor blades 22 from the ground, a winch or the like may be used, so that the rotor blade will be in exact position and is not damaged, which could happen for instance if it slightly tilts when being lifted.

Having installed the large components, the heavy-duty lifting device 54 is taken off from the top, preferably already prior to the first initial operation, at the latest after the first test runs. The process of disassembling the heavy-duty lifting device may be carried out by using the light-duty lifting device which may be still fastened to the tower, or the heavy-duty lifting device 54 dismantles by its own or moves towards the ground by itself. Even for this disassembling process, no external crane or helicopter is used.

By using the light-duty lifting device 34 or the heavy-duty lifting device 54, an auxiliary lifting device 76 is transported to the top 18 and is attached to remain permanently thereon. In FIGS. 9a to 9d, the auxiliary lifting device 76, and examples for the positioning of the auxiliary lifting device 76 are illustrated.

The auxiliary lifting device 76 comprises e.g. a simple, low-cost winch, i.e. a drive unit or also referred to as a lifter 77, and optionally a cantilever arm 78 or a small crane frame on the tower top 18. The lifter 77 may be provided in the area of the top 18 for instance at the side of the nacelle (which is not shown in FIGS. 9a to 9c) and can be deflected, or may be disposed on a permanently provided, lateral cantilever arm 78 (see FIG. 9a) or be situated on the ground and drive a traction feature deflected on the tower top 18.

For servicing or disassembling large components, the auxiliary lifting device 76 pulls the heavy-duty lifting device 54, which has been delivered to the wind energy plant for this use, to the top 18, where the heavy-duty lifting device 54 is fastened to the mounting brackets 56. Here again, no external cranes or helicopters will be used. By using the support on the tower top and hence using the tower as a crane mast, here by using the auxiliary lifting device 76 on the tower top 18, the heavy-duty lifting device 54 is pulled up to the top 18 and temporarily fastened thereto, for instance in order to exchange a defective rotor blade 22 without requiring an external crane or a helicopter. Having exchanged or removed the large component(s), the heavy-duty lifting device 54 will be removed before the restart of the wind energy plant, in particular by using the permanently present auxiliary lifting device 76 which has a lifting force of only a few tons.

The auxiliary lifting device 76, however, may also be accommodated in the nacelle 20 (see FIG. 9d) and transport the heavy-duty lifting device 54 to the top from there.

A cantilever arm or the relatively small crane frame on the tower top 18 also allows (see FIG. 9a) for the lifter 77, i.e. the drive unit of the auxiliary lifting device 76, to be left on the ground and; by using the lifter 77 and from the ground, a traction feature (cable) which can be wound and unwound is moved, which will reach the tower top and then run around a deflection sheave on the cantilever arm 78 or crane. This results in an auxiliary lifting device 76 comprising a drive unit on the ground.

Generally, for exchanging or dismantling a large component, a heavy-duty lifting device suitable for the installation of large components is transported to the tower and is temporarily coupled to the latter using the tower as a crane mast for forming a heavy-duty crane, and will be removed again after installation or disassembling.

Basically, the heavy-duty lifting device preferably is provided with a boom or is coupled thereto, which allows to lower the traction feature of the heavy-duty lifting device from above the nacelle while being supported by the tower to the nacelle or to the rotor blades. The boom may be disposed on the top for a short time only for erecting, servicing or disassembling purposes, or may be permanently attached to the top. In the case with a permanently attached boom, the heavy-duty lifting device is formed by the lifter, i.e. the electric drive unit in the form of a heavy-duty winch or of a large strand jack.

A further possibility of installing the heavy-duty lifting device 54 is to carry it to the tower top in individual parts, for instance by carrying the crane frame and the lifter to the tower top 18 as separate parts, similar as shown in FIGS. 9a to 9d, and coupling the two elements to each other there.

In the embodiment according to FIGS. 10a to 10d, the heavy-duty lifting devices 54 pull themselves up to the top 18 by themselves, in fact preferably together with the crane frame. To this end, a traction feature 80 of the heavy-duty lifting device 54 is attached either to the nacelle 20 or to a lateral cantilever arm 78 permanently fastened to the top 10.

The traction feature 80 may possibly be conveyed to the top 10 by using the auxiliary lifting device 76. Subsequently, and as already stated, the heavy-duty lifting device 54 pulls itself upward by its own. In doing so, the heavy-duty lifting device 54 can be pulled upward headfirst, can be fastened to the mounting brackets 56 first, then pivoted or put through a corresponding support.

The heavy-duty lifting devices 54 may also be provided with counterweights, of course.

Further, the heavy-duty lifting device may be implemented more generally as a tower slewing crane or as a telescopic boom with or without a vertically movable shaft.

Preferably, the lifting devices are electrically powered; this applies to all embodiments, too.

A further advantage of the invention is that the heavy-duty lifting device 54, during installing and/or disassembling the large components, is fastened in the area of the tower top 18, so that there are no long lever arms as is the case with a tower slewing crane or mobile crane placed on the ground, in which the positioning of the components, suspended thereon, for installation and disassembly is very difficult, all the more with windy weather. This also applies to the variant where a cantilever arm or a small crane frame is permanently attached to the tower top, to which the heavy-duty lifting device is temporarily coupled in the form the lifter.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of erecting a wind energy plant comprising a tower and large components attached to a tower top, the large components comprising a nacelle, a generator, and a rotor comprising at least one rotor blade, comprising the following steps:
    using a light-duty lifting device which is not capable of transporting the generator to the tower top and which is designed for lightweight loads to erect the tower and attaching the light-duty lifting device to the tower during construction in order to gain height together with the tower during construction of the tower,
    lifting a heavy-duty lifting device to the tower top with the light-duty lifting device,
    transporting the heavy-duty lifting device to the tower top while being supported by the tower,
    temporarily coupling the heavy-duty lifting device suitable for the installation of the large components to the tower to form a heavy-duty crane by using the tower as a crane mast,
    lifting at least one of the large components with the heavy-duty lifting device to the tower top for installation,
    decoupling the heavy-duty lifting device from the tower after installation of the large components, and
    dismantling the heavy-duty lifting device from the tower after installation of the large components while being supported by the tower.

2. The method according to claim 1, wherein the light-duty lifting device is a rail-type lift or a climbing crane.

3. The method according to claim 1, wherein at least one of the following materials or objects for erecting the tower is carried to the tower top by the light-duty lifting device: concrete, reinforcement material, concrete formwork, prefabricated tower segments or tower rings, composite components, wooden components, a steel mast, or steel mast segments.

4. The method according to claim 1, wherein the heavy-duty lifting device is one of a winch and a strand jack or is formed by one of a cantilever arm and a crane frame comprising a winch or a strand jack as a lifter.

5. The method according to claim 1, wherein the heavy-duty lifting device comprises a crane having a crane frame, said crane being temporarily disposed on the tower top for erecting, servicing, or dismantling purposes and being removed from the tower top after having erected, serviced, or dismantled the large components.

6. The method according to claim 5, wherein the crane frame can be moved in vertical direction, is pivotable, and/or can be moved around the tower.

7. The method according to claim 1, wherein a crane frame is present on the tower top, and the heavy-duty lifting device is temporarily disposed on the tower top and is coupled to the crane frame for the formation of a crane and is removed from the tower top after having carried out construction, maintenance, or dismantling works.

8. The method according to claim 1, including permanently attaching mounting brackets for the heavy-duty lifting device to the tower top.

9. The method according to claim 1, wherein the heavy-duty lifting device is attached to
    a head adapter as a transition between a lower tower mast section made of concrete and a fitted steel mast or a nacelle,
    a transition piece between a lower and an upper tower section,
    an intermediate flange for fastening a steel mast or the nacelle, and/or
    a steel mast or wooden mast fitted on a lower tower section.

10. The method according to claim 1, including permanently attaching a crane bridge to the tower top, and temporarily fitting the heavy-duty lifting device on the crane bridge.

11. The method according to claim 1, including permanently providing a tower cantilever arm on the tower top and engaging the tower cantilever arm with the heavy-duty lifting device.

12. The method according to claim 1, including fastening the heavy-duty lifting device to the tower and pulling the heavy-duty lifting device upward to the tower top via the heavy-duty lifting device.

13. The method according to claim 1, wherein the heavy-duty lifting device alone has such a lifting force that the heavy-duty lifting device is capable of lifting each of the large components to the tower top.

14. A method of servicing or disassembling a wind energy plant comprising a tower and large components attached to a tower top, said large components comprising a nacelle, a generator, and a rotor comprising at least one rotor blade, comprising the following steps:
    for exchanging or dismantling a large component, a heavy-duty lifting device suitable for installation of the large components and having alone such a lifting force that the heavy-duty lifting device is capable of lifting each of the large components to the tower top is transported to the tower, the heavy-duty lifting device comprising a crane frame and a drive unit,
    the crane frame is temporarily coupled to the top of the tower for forming a heavy-duty crane, using the tower as a crane mast,
    the driving unit of the heavy-duty lifting device is installed on the ground,
    exchanging or dismantling the large component(s) using the crane frame on top of the tower and the drive unit on the ground for lowering and lifting the large component(s) to the around and to the top of the tower, respectively, and
    decoupling the heavy-duty lifting device from the tower after having exchanged or dismantled the large component(s).

15. The method according to claim 14, including pulling the heavy-duty lifting device up to the tower top while being supported by the tower top, and, after having exchanged or dismantled the large component(s), removing the heavy-duty lifting device from the wind energy plant while being supported by the tower top.

16. The method according to claim 14, wherein the heavy-duty lifting device is one of a winch and a strand jack or is formed by one of a cantilever arm and a crane frame comprising a winch or a strand jack as a lifter.

17. The method according to claim 14, including permanently attaching mounting brackets for the heavy-duty lifting device to the tower top.

18. The method according to claim 14, wherein the heavy-duty lifting device is attached to a head adapter as a transition between a lower tower mast section made of concrete and a fitted steel mast or a nacelle, a transition piece between a lower and an upper tower section, an intermediate flange for fastening a steel mast or the nacelle, and/or a steel mast or wooden mast fitted on a lower tower section.

19. The method according to claim 14, including permanently attaching a crane bridge to the tower top, and temporarily fitting the heavy-duty lifting device on the crane bridge.

20. The method according to claim 14, including permanently providing a tower cantilever arm on the tower top and engaging the tower cantilever arm with the heavy-duty lifting device.

21. A method of servicing or disassembling a wind energy plant comprising a tower and large components attached to a tower top, said large components comprising a nacelle, a generator, and a rotor comprising at least one rotor blade, comprising the following steps:

for exchanging or dismantling a large component, a heavy-duty lifting device suitable for installation of the large components and having alone such a lifting force that the heavy-duty lifting device is capable of lifting each of the large components to the tower top is transported to the tower and is temporarily coupled to the tower for forming a heavy-duty crane using the tower as a crane mast, fastening the heavy-duty lifting device to the tower and pulling the heavy-duty lifting device upward to the tower top via the heavy-duty lifting device itself, exchanging or dismantling the large component(s) using the heavy-duty lifting device, decoupling the heavy-duty lifting device from the tower after having exchanged or dismantled the large component(s), and moving the heavy-duty lifting device towards the ground by using the heavy-duty lifting device itself and without an external crane or helicopter.

22. The method according to 21, wherein the heavy-duty lifting device comprises a crane having a crane frame, said crane being temporarily disposed on the tower top for erecting, servicing, or dismantling purposes and being removed from the tower top after having erected, serviced, or dismantled the large component(s).

23. The method according to claim 22, wherein the crane frame can be moved in vertical direction, is pivotable, and/or can be moved around the tower.

24. A method of erecting a wind energy plant comprising a tower and a plurality of components attached to a tower top, the plurality of components comprising a nacelle, a generator, and a rotor comprising at least one rotor blade, the method comprising the following steps:

providing a light-duty lifting device that is not capable of transporting at least one of the plurality of components to the tower top and a heavy-duty lifting device that is capable of transporting each of the plurality of components to the tower top, using the light-duty lifting device to erect the tower, attaching the light-duty lifting device to the tower during construction in order to gain height together with the tower during construction of the tower, lifting the heavy-duty lifting device to the tower top with the light-duty lifting device and while being supported by the tower, temporarily coupling the heavy-duty lifting device to the tower to form a heavy-duty crane by using the tower as a crane mast, lifting at least one of the plurality of components with the heavy-duty lifting device to the tower top for installation, decoupling the heavy-duty lifting device from the tower after installation of the plurality of components, and dismantling the heavy-duty lifting device from the tower after installation of the large components while being supported by the tower.

\* \* \* \* \*